United States Patent
Morris et al.

(10) Patent No.: US 8,726,389 B2
(45) Date of Patent: May 13, 2014

(54) METHODS AND APPARATUS FOR DEALING WITH MALWARE

(75) Inventors: Melvyn Morris, Turnditch (GB); Paul Stubbs, Wyboston (GB); Markus Hartwig, Milton Keynes (GB); Darren Harter, Hucclecote (GB)

(73) Assignee: Prevx Limited (GB)

( * ) Notice: Subject to any disclaimer, the term of this patent is extended or adjusted under 35 U.S.C. 154(b) by 0 days.

(21) Appl. No.: 13/543,866

(22) Filed: Jul. 8, 2012

(65) Prior Publication Data

US 2012/0278895 A1 Nov. 1, 2012

Related U.S. Application Data

(63) Continuation of application No. 11/477,807, filed on Jun. 30, 2006.

(30) Foreign Application Priority Data

Jun. 30, 2005 (GB) .................................. 0513375.6

(51) Int. Cl.
*G06F 11/00* (2006.01)
*G06F 7/04* (2006.01)
*G06F 12/14* (2006.01)
*G06F 17/30* (2006.01)

(52) U.S. Cl.
USPC ................... 726/24; 726/22; 726/23; 726/25; 726/26

(58) Field of Classification Search
None
See application file for complete search history.

(56) References Cited

U.S. PATENT DOCUMENTS

| 6,338,141 | B1 | 1/2002 | Wells |
| 6,772,346 | B1 | 8/2004 | Chess |
| 6,944,772 | B2 | 9/2005 | Dozortsev |
| 7,013,483 | B2 | 3/2006 | Cohen et al. |
| 7,093,239 | B1 | 8/2006 | van der Made |
| 7,603,374 | B2 * | 10/2009 | Cameron et al. ...................... 1/1 |

(Continued)

FOREIGN PATENT DOCUMENTS

| EP | 1315066 | 5/2003 |
| EP | 1280040 | 3/2004 |

(Continued)

OTHER PUBLICATIONS

U.S. Appl. No. 60/786,156, filed Apr. 5, 2006, Chiriac.
English Language Abstract of JP 3-233629 published Oct. 17, 1991.
English Language Abstract and Translation of JP 6-110718 published Apr. 22, 1994.

(Continued)

*Primary Examiner* — Cordelia Zecher
*Assistant Examiner* — Trang Doan
(74) *Attorney, Agent, or Firm* — Sheridan Ross P.C.

(57) ABSTRACT

In one aspect, a method of classifying a computer object as malware includes receiving at a base computer data about a computer object from each of plural remote computers on which the object or similar objects are stored. The data about the computer object received from the plural computers is compared in the base computer. The computer object is classified as malware on the basis of said comparison. In one embodiment, the data about the computer object includes one or more of: executable instructions contained within or constituted by the object; the size of the object; the name of the object; the logical storage location or path of the object on the respective remote computers; the vendor of the object; the software product and version associated with the object; and, events initiated by or involving the object when the object is created, configured or runs on the respective remote computers.

30 Claims, 3 Drawing Sheets

(56) References Cited

U.S. PATENT DOCUMENTS

| | | | |
|---|---|---|---|
| 7,793,338 | B1 | 9/2010 | Beddoe et al. |
| 2001/0052014 | A1 | 12/2001 | Sheymov et al. |
| 2002/0087734 | A1* | 7/2002 | Marshall et al. ............ 709/310 |
| 2002/0099952 | A1 | 7/2002 | Lambert et al. |
| 2002/0194490 | A1 | 12/2002 | Halperin et al. |
| 2003/0023857 | A1 | 1/2003 | Hinchlife |
| 2003/0084323 | A1 | 5/2003 | Gales |
| 2003/0101381 | A1 | 5/2003 | Mateev |
| 2003/0131256 | A1 | 7/2003 | Ackroyd |
| 2003/0135791 | A1 | 7/2003 | Natvig |
| 2003/0177394 | A1* | 9/2003 | Dozortsev ................... 713/201 |
| 2003/0195861 | A1 | 10/2003 | McClure et al. |
| 2004/0006704 | A1* | 1/2004 | Dahlstrom et al. .......... 713/200 |
| 2004/0039921 | A1 | 2/2004 | Chuang |
| 2004/0068618 | A1 | 4/2004 | Hooker |
| 2004/0073810 | A1 | 4/2004 | Racine |
| 2004/0083408 | A1 | 4/2004 | Spiegel |
| 2004/0153644 | A1 | 8/2004 | McCorkendale |
| 2004/0255165 | A1 | 12/2004 | Szor |
| 2005/0021994 | A1* | 1/2005 | Barton et al. ................ 713/200 |
| 2005/0022014 | A1 | 1/2005 | Shipman |
| 2005/0027686 | A1 | 2/2005 | Shipp |
| 2005/0086500 | A1 | 4/2005 | Albomoz |
| 2005/0210035 | A1* | 9/2005 | Kester et al. ................... 707/10 |
| 2006/0085857 | A1* | 4/2006 | Omote et al. ................... 726/24 |
| 2007/0016953 | A1 | 1/2007 | Morris et al. |
| 2008/0209562 | A1 | 8/2008 | Szor |
| 2008/0320595 | A1 | 12/2008 | van der Made |
| 2009/0271867 | A1 | 10/2009 | Zhang |
| 2012/0278891 | A1 | 11/2012 | Morris et al. |

FOREIGN PATENT DOCUMENTS

| | | |
|---|---|---|
| EP | 1536341 | 6/2005 |
| EP | 1549012 | 6/2005 |
| JP | 3-233629 | 10/1991 |
| JP | 6-110718 | 4/1994 |
| JP | 9-504395 | 4/1997 |
| JP | 2003-196112 | 7/2003 |
| WO | WO 95/12162 | 5/1995 |
| WO | WO 96/30829 | 10/1996 |
| WO | WO 99/15966 | 4/1999 |
| WO | WO 02/33525 | 4/2002 |
| WO | WO 03/021402 | 3/2003 |
| WO | WO 2004/097602 | 11/2004 |

OTHER PUBLICATIONS

English Language Abstract of JP 2003-196112 published Jul. 11, 2003.
Related U.S. Appl. No. 11/694,261.
Zenkin "Fighting Against the invisible Enemy—Methods for detecting an unknown virus," Computers & Security, Elsevier Science Publishers, Amsterdam, NL, vol. 20, No. 4, Jul. 31, 2001, pp. 316-321, XP004254268.
International Search Report issued in PCT/GB2006/002439 issued Jan. 15, 2007.
English Translation of Official Action for China Patent Application No. 201110036121.8, dated Sep. 24, 2012, 8 pages.
Official Action with English translation for China Patent Application No. 201110036121.8, dated Oct. 10, 2011, 14 pages.
Japanese Office Action issued in JP 2008-518975 on Sep. 13, 2011.
English Language Translation of Japanese Office Action issued in JP 2008-518975 on Sep. 13, 2011.
Official Action for U.S. Appl. No. 11/477,807, mailed Jan. 13, 2010, 8 pages.
Official Action for U.S. Appl. No. 11/477,807, mailed May 4, 2010, 13 pages.
Official Action for U.S. Appl. No. 11/477,807, mailed Sep. 28, 2010, 11 pages.
Official Action for U.S. Appl. No. 11/477,807, mailed Feb. 15, 2011, 13 pages.
Official Action for U.S. Appl. No. 11/477,807, mailed Jul. 25, 2011, 13 pages.
Notice of Allowance for U.S. Appl. No. 11/477,807, mailed Mar. 21, 2012, 9 pages.
Notice of Allowance for U.S. Appl. No. 11/477,807, mailed Dec. 13, 2012, 7 pages.
Official Action for China Patent Application No. 201110036124.1, dated Apr. 17, 2013, 7 pages.
Official Action for U.S. Appl. No. 13/543,865, mailed Apr. 15, 2013, 9 pages.
Official Action for European Patent Application No. 06755686.0 dated Jul. 31, 2013, 5 pages.
Extended European Search Report for European Patent Application No. 13167434.3 dated Aug. 1, 2013, 6 pages.
Extended European Search Report for European Patent Application No. 13167436.8 dated Aug. 30, 2013, 5 pages.
Official Action for U.S. Appl. No. 13/543,865, mailed Aug. 6, 2013, 11 pages.
Official Action with English Translation for China Patent Application No. 20110036124.1, dated Oct. 23, 2013, 8 pages.

* cited by examiner

METHODS AND APPARATUS FOR DEALING WITH MALWARE

This application is a continuation of U.S. application Ser. No. 11/477,807 filed Jun. 30, 2006, which claims priority to United Kingdom Application No. 0513375.6, filed Jun. 30, 2005. The entirety of all of the above-listed Applications are incorporated herein by reference.

The present invention relates generally to methods and apparatus for dealing with malware. In one aspect, the present invention relates to a method and apparatus for classifying a computer object as malware. In another aspect, the present invention relates to a method and apparatus for determining the protection that a remote computer has from malware. In another aspect, the present invention relates to a method and apparatus for classifying a computer object as malware or as safe. In another aspect, the present invention relates to a method of installing software on a computer.

The term "malware" is used herein to refer generally to any executable computer file or, more generally "object", that is or contains malicious code, and thus includes viruses, Trojans, worms, spyware, adware, etc. and the like.

A typical anti-malware product, such as anti-virus scanning software, scans objects or the results of an algorithm applied to the object or part thereof to look for signatures in the object that are known to be indicative of the presence of a virus. Generally, the method of dealing with malware is that when new types of malware are released, for example via the Internet, these are eventually detected. Once new items of malware have been detected, then the service providers in the field generate signatures that attempt to deal with these and these signatures are then released as updates to their anti-malware programs. Heuristic methods have also been employed.

These systems work well for protecting against known malicious objects. However, since they rely on signature files being generated and/or updated, there is inevitably a delay between a new piece of malware coming into existence or being released and the signatures for combating that malware being generated or updated and supplied to users. Thus, users are at risk from new malware for a certain period of time which might be up to a week or even more. Moreover, in order to try to defeat anti-virus products, the malware writers use obfuscation techniques in order to attempt to hide the signature or signature base data of the virus code from detection. Typically, the obfuscation involves encrypting or packing the viral code.

WO-A-2004/097602 describes a system that analyses computer files received or generated by a local computer and compares these with a database of known files to determine whether a particular file is known and if so whether it has been known about long enough that it can be regarded as "safe". However, in practice, on its own this is not likely to provide for adequate protection because, for example, the active payload of a virus or Trojan may only be programmed to activate at a particular date, or upon receiving a message or instruction from a local or remote system or process, or on the occurrence of a particular event that may be many months or even years after the process has been first run or is released. Thus, just looking at the age of a file is an unsatisfactory way of determining whether it is properly safe and will remain so.

In the system of US-A-2004/0083408, a worm in a file is detected by examining connection attempts made by the specific file running on a computer.

U.S. Pat. No. 6,944,772, U.S. Pat. No. 6,772,346, EP-A-1549012 and EP-A-1280040 all disclose "community-based" anti-malware systems in which a plurality of "local" computers all connect via a network (which may be a LAN or the Internet, for example) to a central computer. On encountering a file that is not already known to them, the local computers send a request to the central computer for authorisation to run the file. If the file is recognised at the central computer, then the central computer can send permission for the local computer to run the file if the file is known to be safe or send a "deny" command if the file is known to be malicious. However, in each of these prior art proposals, if the file is not known at the central computer, then the whole file is sent to the central computer where it can be analysed to determine whether it should be regarded as safe or malware. Such analysis is typically carried out manually or "semi-manually" by subjecting the file to detailed analysis, for example by emulation or interpretation, which can still take days given the human involvement that is typically required. There is therefore still a considerable period of time before a new file is classified as safe or as malware. In the case of these prior art systems, the request for authorisation to run the file that is sent by a local computer to the central computer may comprise sending a checksum or "signature" or "key" that uniquely represents the file.

A similar community-based anti-malware system is disclosed in WO-A-02/33525. In this system, in the case that a local computer is seeking clearance to run a file that is not known by the central computer to be safe or malware, some limited audit information about the prevalence of the file on other local computers can be sent to a human system administrator associated with the local computer that is seeking permission to run the file. The human system administrator can therefore make a better informed though still "manual" decision as to whether or not the file is safe to run.

In the system of US-A-2004/0073810, a metafile containing data about an attachment or other transmitted file is sent to a central computer. The data about that file is analysed to determine a likelihood of the transmitted file being malware. A specific example given is that if the transmitted file has been transmitted via at least a certain number of servers, then it should be treated as malware.

In the systems disclosed in US-A-2005/0021994 and US-A-2004/0153644, pre-approved files, which may be certified as safe by for example the software vendor associated with the files, may be permitted always to run without further checking. In one embodiment of the system of US-A-2004/0153644, monitoring is carried out to decide that a file is malicious if an abnormally high number of requests by that file is received at a central authority from plural local computers in a time period or if an abnormally high number of requests by that file on a single computer is received from the single local computer in a time period.

In the system of US-A-2004/0006704, a comparison is made between installed versions of software on a computer with a database of software versions and their known vulnerabilities. A user of the computer can therefore be informed of specific risks and how to minimise those risks by updating existing or installing new software.

In the system of WO-A-03/021402, a central database holds a virtual image of all files stored on each of plural local computers. If a threat in one local computer is identified, other local computers with a similar configuration can be notified of the risk.

Thus, the prior art systems either rely on deep analysis of a new object in order to determine whether or not the object is malicious, which introduces delay and therefore risk to users during the period that the file is analysed and new anti-malware signatures distributed, or limited analysis of the operation of the particular object or its method of transmission to a computer is carried out to decide a likelihood of the object being malicious.

According to a first aspect of the present invention, there is provided a method of classifying a computer object as malware, the method comprising:

at a base computer, receiving data about a computer object from each of plural remote computers on which the object or similar objects are stored;

comparing in the base computer the data about the computer object received from the plural computers; and, classifying the computer object as malware on the basis of said comparison.

Compared to the prior art that relies solely on signature matching, this aspect allows a comparison to be made between the objects and/or their effects on the different remote computers to determine whether or not a particular object should be classed as good or as malware. Sophisticated pattern analysis can be carried out. This allows a rapid determination of the nature of the object to be made, without requiring detailed analysis of the object itself as such to determine whether it malware and also avoids the need to generate new signatures to be used for signature matching as in the conventional prior art anti-virus software.

In a preferred embodiment, the data about the computer object that is sent from the plural remote computers to the base computer and that is used in the comparison includes one or more of: executable instructions contained within or constituted by the object; the size of the object; the current name of the object; the physical and folder location of the object on disk; the original name of the object; the creation and modification dates of the object; vendor, product and version and any other information stored within the object; the object header or header held by the remote computer; and, events initiated by or involving the object when the object is created, configured or runs on the respective remote computers.

Preferably, the comparing identifies relationships between the object and other objects. In an example, this can be used immediately and automatically to mark a child object as bad (or good) if the or a parent or other related object is bad (or good). Thus, if at least one other object to which said object is related is classed as malware, then the method may comprise classifying said object as malware. Said other objects include the object or similar objects stored on at least some of the remote computers. Said other objects may include other objects that are parent objects or child objects or otherwise process-related objects to said object.

In a most preferred embodiment, the data is sent in the form of key that is obtained by a hashing process carried out in respect of the objects on the respective remote computers. A major advantage of using such a key is that it keeps down the volume of data that needs to be transmitted to the base computer. Given that there may be thousands or even millions of connected remote computers and further given that each may send details about very many objects, this can be an important advantage.

The key preferably has at least one component that represents executable instructions contained within or constituted by the object. This important preferred feature allows a comparison to be made at the base computer of only the executable instructions of the object. This means for example that differently named objects that basically have the same executable instructions, which is often an indicator that the objects are malware, can nevertheless be regarded as the "same" object for this purpose. As another example, a new version of a program may be released which has minor changes compared to a previous version already known to the base computer and which in substance, at least in respect of the executable instructions, can be regarded as being the same as the previous version. In that case, the minor differences can be ignored and the objects regarded as being the same. Not only is this useful in distinguishing between malware and for example revised versions of previous software, it also keeps down the data transmission and storage requirements because the base computer can inform the remote computers that an apparently new object is for this purpose the same as a previously known object, thus avoiding having the remote computers send full details about the object or the object itself to the base computer.

The key preferably has at least one component that represents data about said object. Said data about said object may include at least one of: the current name of the object; the physical and folder location of the object on disk; the original name of the object; the creation and modification dates of the object; vendor, product and version and any other information stored within the object; the object header or header held by the remote computer; and, events initiated by or involving the object when the object is created, configured or runs on the respective remote computers.

The key preferably has at least one component that represents the physical size of the object.

Where more than one of these components are present in the key, the plural components are preferably severable.

The method may comprise initially classifying an object as not malware, generating a mask for said object that defines acceptable behaviour for the object, and comprising monitoring operation of the object on at least one of the remote computers and reclassifying the object as malware if the actual monitored behaviour extends beyond that permitted by the mask. This provides an efficient and effective way of monitoring the behaviour of an object that has been classified or regarded as good and allows the object to be reclassified quickly as malware if the behaviour of the object warrants it.

According to a second aspect of the present invention, there is provided apparatus for classifying a computer object as malware, the apparatus comprising:

a base computer constructed and arranged to receive data about a computer object from each of plural remote computers on which the object or similar objects are stored;

the base computer being constructed and arranged to compare the data about the computer object received from said plural computers; and, the base computer being constructed and arranged to classify the computer object as malware on the basis of said comparison.

According to a third aspect of the present invention, there is provided a method of providing data about a computer object from a remote computer to a base computer so that a comparison can be made at the base computer with similar data received from other remote computers, the method comprising:

providing from a remote computer to a base computer data about a computer object that is stored on the remote computer;

the data including one or more of: executable instructions contained within or constituted by the object; the size of the object; the current name of the object; the physical and folder location of the object on disk; the original name of the object; the creation and modification dates of the object; vendor, product and version and any other information stored within the object; the object header or header held by the remote computer; and, events initiated by or involving the object when the object is created, configured or runs on the respective remote computers;

the data being sent in the form of key that is obtained by a hashing process carried out in respect of the object on the remote computer.

This method, which may be carried out by so-called agent software running on the remote computer, allows for efficient sending of data to the base computer, which minimises data transmission and storage requirements and also permits rapid analysis to be made at the base computer.

The key preferably has at least one component that represents executable instructions contained within or constituted by the object.

The key preferably has at least one component that represents data about said object. Said data about said object may include at least one of: the current name of the object; the physical and folder location of the object on disk; the original name of the object; the creation and modification dates of the object; vendor, product and version and any other information stored within the object; the object header or header held by the remote computer; and, events initiated by or involving the object when the object is created, configured or runs on the respective remote computers.

The key preferably has at least one component that represents the physical size of the object.

According to a fourth aspect of the present invention, there is provided a method of determining the protection that a remote computer has from malware, the method comprising:

receiving at a base computer details of all or selected security products operating at a point in time on said remote computer;

receiving similar information from other remote computers connected to the base computer; and, identifying any malware processes that were not identified by said other remote computers having that particular combination of security products.

In this way, the base computer can be used to obtain information as to whether for example a particular, specific combination of operating system and various security products, including settings and signature files existing at a point in time, renders a particular computer having those products and settings susceptible or vulnerable to any particular malware object. The user can be advised accordingly and for example provided with recommendations for remedying the situation.

The method may therefore comprise providing information to the user of said remote computer that said remote computer may be susceptible to attack by said malware processes on the basis of said identifying.

The details of all or selected security products preferably includes the name of the security products, versions, and loaded signature files.

According to a fifth aspect of the present invention, there is provided apparatus for determining the protection that a remote computer has from malware, the apparatus comprising:

a base computer constructed and arranged to receive computer details of all or selected security products operating at a point in time on said remote computer;

the base computer being constructed and arranged to receive similar information from other remote computers connected to the base computer; and, the base computer being constructed and arranged to identify any malware processes that were not identified by said other remote computers having that particular combination of security products.

According to a sixth aspect of the present invention, there is provided a method of classifying a computer object as malware or as safe, wherein said computer object is a descendant or otherwise related object of a first computer object, the method comprising:

classifying a first computer object as malware or as safe;

identifying in a key relating to said first computer object a component that uniquely identifies the first computer object and that is inherited or otherwise present in the key of a descendant or other related computer object of the first computer object; and, classifying said computer object as malware or as safe as the case may be on the basis of the unique identifier component being present in the key of said computer object.

This aspect uses the concept of ancestry to enable objects to be marked as malware. For example, any particular process may spawn child processes which are therefore related. The key relating to the first object may be inspected to identify a component that uniquely identifies the first object and that is inherited or otherwise present in the key of a descendant or other related object of the first object.

The method may comprise monitoring activities of said first computer object and reclassifying the first computer object as malware in the case that it was initially classified as safe and subsequently determined to be malware, the method further comprising automatically classifying as malware any computer object that has a key in which said unique identifier component is present.

According to a seventh aspect of the present invention, there is provided apparatus for classifying a computer object as malware or as safe, wherein said computer object is a descendant or otherwise related object of a first computer object, the apparatus comprising:

a computer constructed and arranged to classify a first computer object as malware or as safe;

the computer being constructed and arranged to identify in a key relating to said first computer object a component that uniquely identifies the first computer object and that is inherited or otherwise present in the key of a descendant or other related computer object of the first computer object; and, the computer being constructed and arranged to classify said computer object as malware or as safe as the case may be on the basis of the unique identifier component being present in the key of said computer object.

According to an eighth aspect of the present invention, there is provided a method of installing software on a computer, the method comprising:

on initiation of installation of software on a computer, providing a computer-generated prompt on the computer to a user to ascertain whether the user authorises the installation; and, ceasing the installation if a user authorisation is not received, else:

receiving at the computer the user's authorisation to proceed with the installation;

proceeding with the installation;

obtaining data about computer objects that are created or used during the installation;

storing said data at the local computer.

This provides for security when a user is installing new software and is not for example connected to a base computer having a community database of the type mentioned above. In that case, the method, which may be implemented in agent software running on the local computer, allows the user to permit the installation to proceed whilst at the same time gathering data about the objects (such as processes, new files, etc.) that are created during the installation.

Preferably, the locally stored data is referred to during the installation to ensure that all objects created or used during the installation are part of the installation process, and, if it is found that objects created or used during the installation are not part of the installation process, either or both of: (i) ceasing the installation and (ii) providing a computer-generated prompt on the computer to the user accordingly. This allows the method to ensure that only those objects that are required for the installation are permitted to be created or used and thus avoids unwittingly allowing malware to install (given that malware often creates objects that are not expected as part of a normal installation of new software).

In a preferred embodiment, the method comprises connecting the computer to a community database that is connectable to a plurality of computers, and uploading the stored data to the community database for comparison with similar data provided by other computers.

The method may comprise downloading data about trusted installers to the computer, said data about trusted installers being referred to during the installation such that any objects relating to or created by the trusted installer are automatically authorised to proceed. This facilitates installation of software that is known a priori to be trustworthy.

Said data about trusted installers may be referred to only for a predetermined time period following receipt at the computer of the user's authorisation to proceed with the installation.

The present invention also includes computer programs comprising program instructions for causing a computer to perform any of the methods described above.

Although the embodiments of the invention described with reference to the drawings comprise computer processes performed in computer apparatus and computer apparatus itself, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

Embodiments of the present invention will now be described by way of example with reference to the accompanying drawings, in which.

Figure 1:
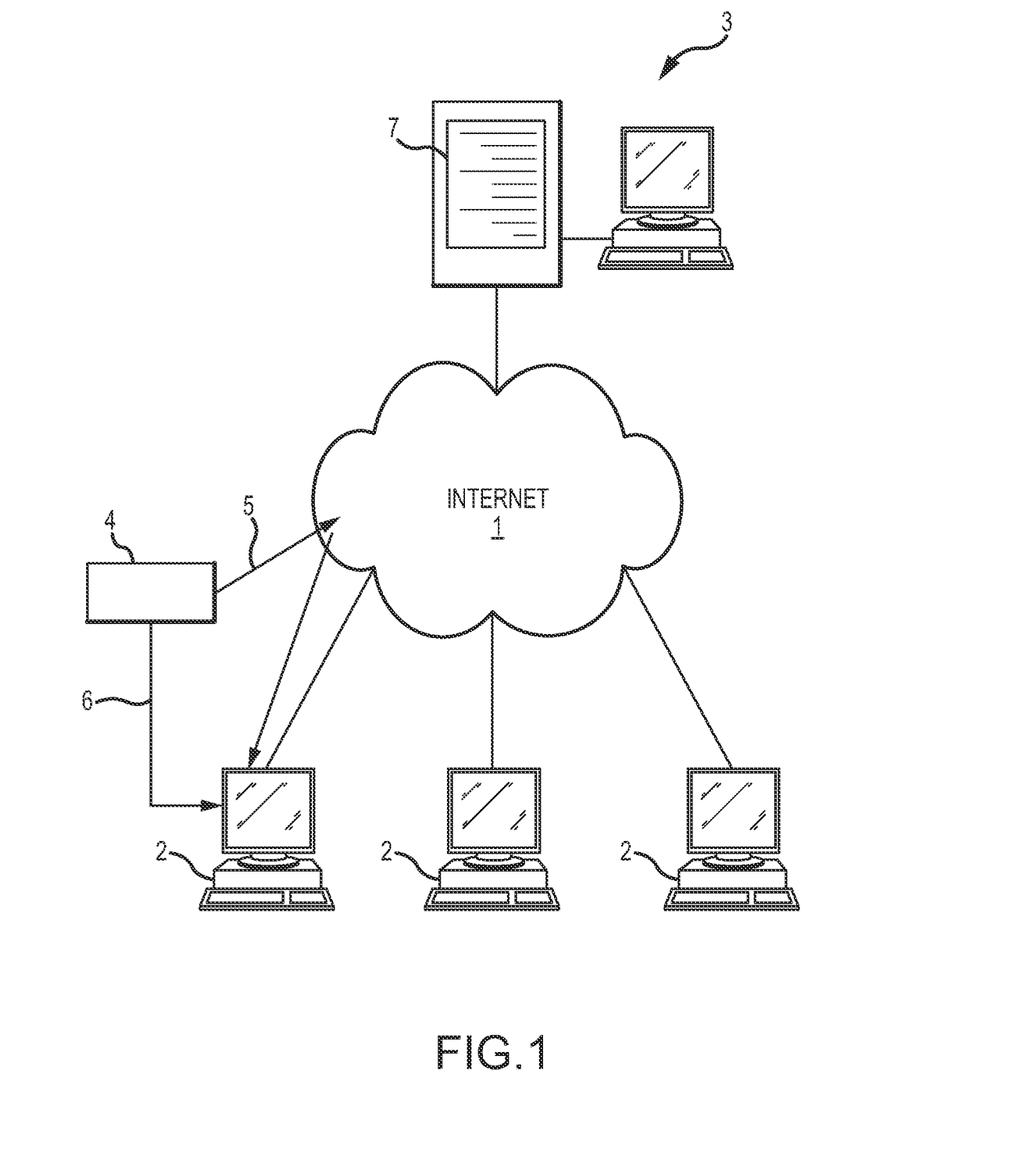
FIG. 1 shows schematically apparatus in which an embodiment of the present invention may be implemented.

Referring to FIG. 1, a computer network is generally shown as being based around a distributed network such as the Internet 1. The present invention may however be implemented across or use other types of network, such as a LAN. Plural local or "remote" computers 2 are connected via the Internet 1 to a "central" or "base" computer 3. The computers 2 may each be variously a personal computer, a server of any type, a PDA, mobile phone, an interactive television, or any other device capable of loading and operating computer objects. An object in this sense may be a computer file, part of a file or a sub-program, macro, web page or any other piece of code to be operated by or on the computer, or any other event whether executed, emulated, simulated or interpreted. An object 4 is shown schematically in the figure and may for example be downloaded to a remote computer 2 via the Internet 1 as shown by lines 5 or applied directly as shown by line 6.

In one preferred embodiment, the base computer 3 holds a database 7 with which the remote computers 2 can interact when the remote computers 2 run an object 4 to determine whether the object 4 is safe or unsafe. The community database 7 is populated, over time, with information relating to each object run on all of the connected remote computers 2. As will be discussed further below, data representative of each object 4 preferably takes the form of a so-called signature or key relating to the object and its effects. As will also be discussed further below, the database 7 may further include a mask for the object 4 that sets out the parameters of the object's performance and operation.

Figure 2:
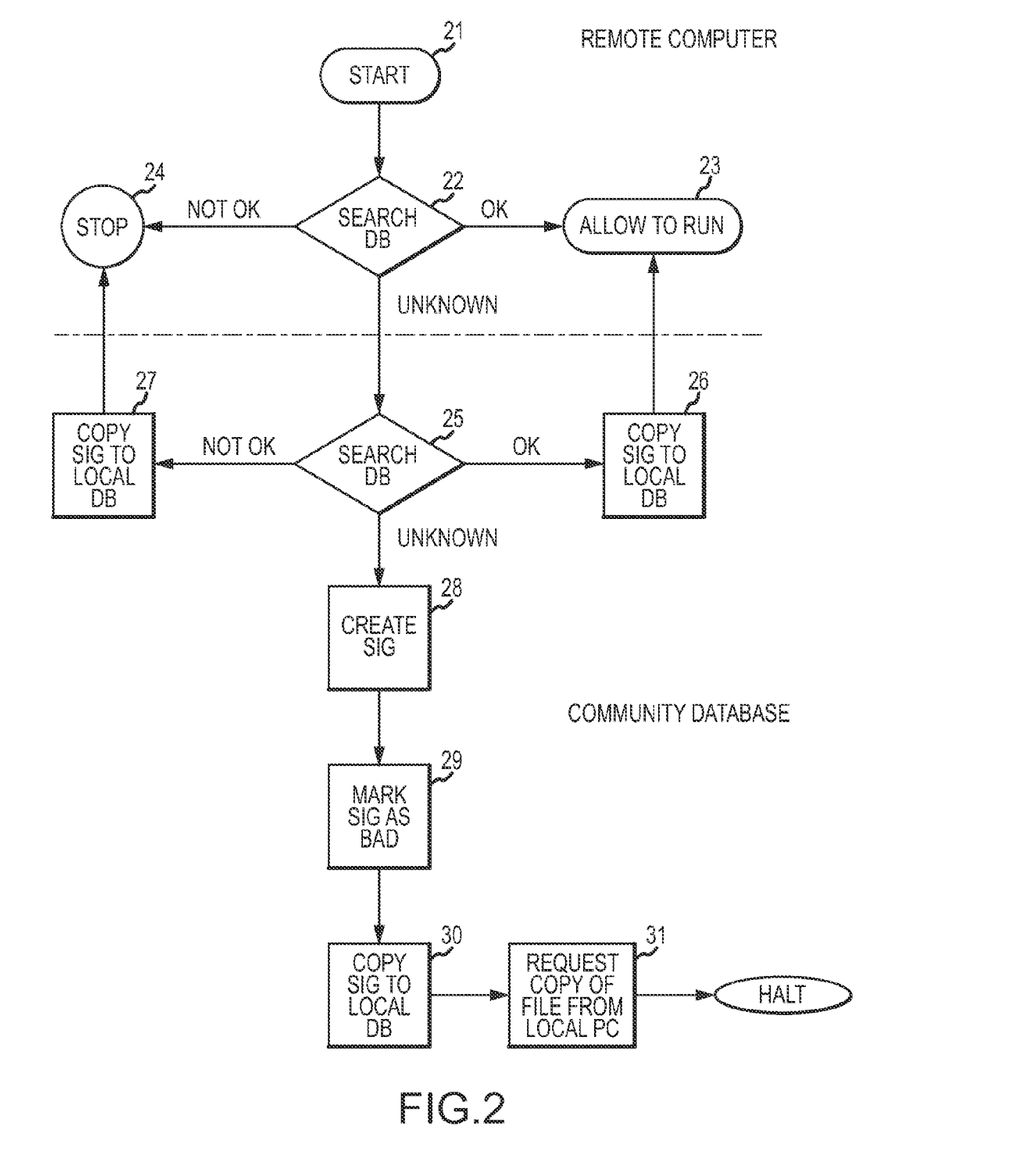
FIG. 2 is a flowchart showing schematically the operation of an example of a method according to an embodiment of the present invention.

Referring now to FIG. 2, at the start point 21, a computer object 4 such as a process is run at a remote computer 2. At step 22, by operation of local "agent" software running on the remote computer 2, the operation of the process is hooked so that the agent software can search a local database stored at the remote computer 2 to search for a signature or key representing that particular process, its related objects and/or the event. If the local signature is present, it will indicate either that the process is considered to be safe or will indicate that that process is considered unsafe. An unsafe process might be one that has been found to be malware or to have unforeseen or known unsafe or malevolent results arising from its running. If the signature indicates that the process is safe, then that process or event is allowed by the local agent software on the remote computer 2 to run at step 23. If the signature indicates that the process is not safe, then the process or event is stopped at step 24.

It will be understood that there may be more than two states than "safe" or "not-safe" and choices may be given to the user. For example, if an object is considered locally to be not safe, the user may be presented with an option to allow the related process to run nevertheless. It is also possible for different states to be presented to each remote computer 2. The state can be varied by the central system to take account of the location, status or ownership of the remote computer or timeframe.

If the object is unknown locally, then details of the object are passed over the Internet 1 or other network to the base computer 3 for storing in the community database 7 and preferably for further analysis at the base computer 3. In that case, the community database 7 is then searched at step 25 for a signature for that object that has already been stored in the community database 7. The community database 7 is supplied with signatures representative of objects, such as programs or processes, run by each monitored remote computer 2. In a typical implementation in the field, there may be several thousands or even millions of remote computers 2 connected or connectable to the base computer 3 and so any objects that are newly released upon the Internet 1 or that otherwise are found on any of these remote computers 2 will soon be found and signatures created and sent to the base computer 3 by the respective remote computers 2.

When the community database 7 is searched for the signature of the object that was not previously known at the remote computer 2 concerned, then if the signature is found and indicates that that object is safe, then a copy of the signature or at least a message that the object is safe is sent to the local database of the remote computer 2 concerned at step 26 to populate the local database. In this way, the remote computer 2 has this information immediately to hand the next time the object 4 is encountered. A separate message is also passed back to the remote computer 2 to allow the object to run in the current instance.

If the signature is found in the community database 7 and this indicates for some reason that the object is unsafe, then again the signature is copied back to the local database and marked "unsafe" at step 27, and/or a message is sent to the remote computer 2 so that running of the object is stopped (or it is not allowed to run) and/or the user given an informed choice whether to run it or not.

If after the entire community database 7 has been searched the object is still unknown, then it is assumed that this is an entirely new object which has never been seen before in the field. A signature is therefore created representative of the object at step 28, or a signature sent by the remote computer 2 is used for this purpose, and this signature is initially marked as bad or unsafe community database 7 at step 29. The signature is copied to the local database of the remote computer 2 that first ran the object at step 30. A message may then be passed to the remote computer 2 to instruct the remote computer 2 not to run the object or alternatively the user may be given informed consent as to whether to allow the object to run or not. In addition, a copy of the object itself may be requested at step 31 by the community database 7 from the remote computer 2.

If the user at the remote computer 2 chooses to run a process that is considered unsafe because it is too new, then that process may be monitored by the remote computer 2 and/or community database 7 and, if no ill effect occurs or is exhibited after a period of time of n days for example, it may then be considered to be safe. Alternatively, the community database 7 may keep a log of each instance of the process which is found by the many remote computers 2 forming part of the network and after a particular number of instances have been recorded, possibly with another particular number of instances or the process being allowed to run and running safely, the signature in the community database 7 may then be marked as safe rather than unsafe. Many other variations of monitoring safety may be done within this concept.

The details of an object 4 that are passed to the base computer 3 are preferably in the form of a signature or "key" that uniquely identifies the object 4. This is mainly to keep down the data storage and transmission requirements. This key may be formed by a hashing function operating on the object at the remote computer 2.

The key in the preferred embodiment is specially arranged to have at least three severable components, a first of said components representing executable instructions contained within or constituted by the object, a second of said components representing data about said object, and a third of said components representing the physical size of the object. The data about the object in the second component may be any or all of the other forms of identity such as the file's name, its physical and folder location on disk, its original file name, its creation and modification dates, vendor, product and version and any other information stored within the object, its file header or header held by the remote computer 2 about it; and, events initiated by or involving the object when the object is created, configured or runs on the respective remote computers. In general, the information provided in the key may include at least one of these elements or any two or more of these elements in any combination.

In one preferred embodiment, a check sum is created for all executable files, such as (but not limited to) .exe and .dll files, which are of the type PE (Portable Executable file as defined by Microsoft). Three types of checksums are generated depending on the nature of the file:

Type 1: five different sections of the file are check summed. These include the import table, a section at the beginning and a section at the end of the code section, and a section at the beginning and a section at the end of the entire file. This type applies to the vast majority of files that are analysed;

Type 2: for old DOS or 16 bit executable files, the entire file is check summed;

Type 3: for files over a certain predefined size, the file is sampled into chunks which are then check summed. For files less than a certain predefined size, the whole file is check summed.

For the check summing process, in principle any technique is possible. The MD5 (Message-Digest algorithm 5) is a widely-used cryptographic hash function that may be used for this purpose.

This allows a core checksum to be generated by viewing only the executable elements of the checksum and making a comparison between two executables that share common executable code.

For the type 1 checksum mentioned above, three signature processes may be used. The first defines the entire file and will change with almost any change to the file's content. The second attempts to define only the processing instructions of the process which changes much less. The third utilises the file's size, which massively reduces the potential of collisions for objects of differing sizes. By tracking the occurrences of all signatures individually appearing with different counterparts, it is possible to identify processes that have been changed or have been created from a common point but that have been edited to perform new, possibly malevolent functionality.

This "meta data" enables current and newly devised heuristics to be run on the data in the community database 7.

The data stored in the community database 7 provides an extensive corollary of an object's creation, configuration, execution, behaviour, identities and relationships to other objects that either act upon it or are acted upon by it.

The preferred central heuristics use five distinct processes to establish if an object is safe, unsafe or suspicious.

The first of the said processes utilises the singularity or plurality of names, locations, vendor, product and version information captured and correlated from all of the remote computers 2 that have seen the object. By considering the plurality of this information for a single object, a score can be determined which can be used as a measure of the authenticity and/or credibility of the object. Most safe objects tend not to use a large plurality of identifying information or locations. Rules can be established to consider this information in respect of the type of object and its location. For example, temporary files often utilise a plurality of system generated file names which may differ on each remote computer for the same object. Where an object has little plurality, then it provides a reference point to consider its behaviour in comparison to the known behaviours of other objects that have previously used that identifying information. For example, a new object that purports to be a version of notepad.exe can have its behaviour compared with the behaviour of one or more other objects that are also known as notepad.exe. This comparison may be against a single other object or multiple other objects that use the same or even similar identifying information. In this way, new patterns of behaviour can be identified for the new object. Also it allows the preferred embodiment to police an object's behaviour over time to identify new behavioural patterns that may cause an object that was previously considered safe to have its status reconsidered. Alternatively, the score based on identities may be considered along with scores for other objects or scores created by other processes on this object to be considered in combinations.

The second of the said processes utilises an object's relationship to other objects that act upon it or upon which it acts. For example, analysis can be made of which object created this object, which objects this object created, which objects created a registry key to run or configure this object, which objects were configured by or had registry keys created by this object, etc. In this regard an object is considered to have a relationship based on the event performed by it upon another object, or upon it by another object. This simple 1-to-1 relationship chain provides a complex series of correlation points, allowing ancestral relationships to be considered for any object and its predecessors by event or its issue (i.e.

child and sub-child processes) by event. This allows a score to be developed that describes its relationships and associations with known, unknown, known safe or known bad objects or a combination thereof. Objects that have specific relationships, volumes of relationships or mixes of relationships to one type or another may be judged safe or unsafe accordingly. Alternatively, the relationship-based score may be considered along with other scores to arrive at a determination of safe or unsafe. This data can also be used to deduce a number of factors about objects related directly or via other objects and their behaviours. For example it is possible to deduce how one object's behaviour can be influenced or changed by its association or linkage to another. Consider for example notepad.exe as supplied by Microsoft with the Windows series of operating systems. It has a limited range of functionality and would not be expected therefore to perform a wide variety of events, such as transmitting data to another computer or running other programs etc. However, the behaviour of notepad.exe could be modified by injecting new code into it, such as via dynamic link library injection (DLL injection). In this case notepad.exe would now have new capabilities derived by the code injection or linkage to another object. Using the data that defines the relationships between objects it is possible to deduce that the new behaviours of a program can be attributed to the association with another object. If that new behaviour is malevolent, then it is possible to mark either or all processes as unsafe as appropriate.

The combination of behaviours captured provide a basis to determine if the object is safe or unsafe. Malware typically exhibit certain behaviour and characteristics. For example, malware frequently has a need to self-persist. This manifests itself in the need to automatically restart on system restarts or upon certain events. Creating objects in specific locations to auto restart or trigger execution is a typical characteristic of malware. Replacing core objects of the Windows system environment are another example of typical characteristics of malware. By providing a pattern of behaviour, the determination of objects to be unsafe or safe can be automated. The centralisation of the community data in the community database 7 provides the ability to rapidly assimilate object behaviours, allowing for the rapid identification and determination of malware. Objects may also perform events upon themselves which can be considered in deriving a score.

The third said process involves time and volumes. Relevant data includes when the object was first seen, when it was last seen, how many times it has been seen, how many times it has been seen in a given interval of time, and the increase or decrease of acceleration in it being seen. This information is highly relevant in determining the prevalence of an object in the community of remote computers. A score is developed based on these metrics which can be used to determine if an object is safe, unsafe or too prevalent to allow it to execute or propagate without very thorough examination. In this case, the object can be temporarily held or blocked from executing pending further information about its behaviour or relationships. This score may also be used in combination with scores from other processes. Time is also highly relevant in combination with other information, including but not limited to behaviours and identities. For example in the case of polymorphic or randomly named objects, time is a powerful qualifier. (A polymorphic virus changes its encryption algorithm and the corresponding encryption keys each time it replicates from one computer to another and so can be difficult to detect by conventional measures.) A program that creates other programs can often be considered normal or abnormal based on its activity over time.

The fourth said process considers the behaviour of an object. This allows a score to be developed based on the types of events performed by an object or events performed on it by itself or other objects. The centralised system of the community database 7 allows for an unlimited number of event types and can consider the object performing the event or the object having the event performed upon it, or both. Some event types also relate to external information other than objects, for example a program performing an event to connect with an Internet Chat Relay site, or a program modifying a non-executable file such as the Windows hosts file. The behavioural events of an object, be they as "actor" (i.e. the object doing something to another object) or as "victim" (i.e. the object has something done to it by another object) of any event can be considered in many ways, such as in combination, in sequence, in volume, in presence or absence, or in any combination thereof. The behavioural events in the preferred embodiment may have been provided by a remote computer 2 or from other external sources. The process can consider these in isolation or in combination. Furthermore it is a feature of the preferred embodiment that the behavioural events can be considered in combination with the status of other objects upon which the object acts or that act upon the object. For example, creating a program may have a different score if the program being created is safe, unsafe, new, unknown or suspicious. Similarly, a program that is created by a known bad program will likely have a different score attributed to its creation event depending on the status of the object creating it.

The fifth process considers the behaviour of a web page or script. In this respect, the web page and url combination is assigned a unique identity which allows its behaviour to be tracked as if it were an object like any other executable file. In this example, the web page may perform events that would normally be seen as events performed by the web browser (e.g. IExplore.exe or Firefox.exe). The preferred embodiment substitutes the identifying details and signatures of the web browser for the "pseudo" object identity associated with the web page being displayed or executing within the browser. In this respect, the status of the web page and/or web site to which it relates may be determined as safe, unsafe, unknown or suspicious in the same way as any other object. The web page's "pseudo" object identity also allows the preferred embodiment to block, interject or limit the functionality of that web page or web site to prevent some or all of its potentially unsafe behaviour or to provide the remote user with qualifying information to guide them about the safety of the web site, web page or their content.

Amongst other types, the types of meta data captured might be:

"Events": these define the actions or behaviours of an object acting upon another object or some other entity. The event has three principal components: the key of the object performing the act (the "Actor"), the act being performed (the "Event Type"), and the key of the object or identity of an other entity upon which the act is being performed (the "Victim"). While simple, this structure allows a limitless series of behaviours and relationships to be defined. Examples of the three components of an event might be:

| Actor | Event Type | Victim |
| --- | --- | --- |
| Object 1 | Creates Program | Object 2 |
| Object 1 | Sends data | IP Address 3 |
| Object 1 | Deletes Program | Object 4 |
| Object 1 | Executes | Object 2 |
| Object 2 | Creates registry key | Object 4 |

"Identities": these define the attributes of an object. They include items such as the file's name, its physical location on the disk or in memory, its logical location on the disk within the file system (its path), the file's header details which include when the file was created, when it was last accessed, when it was last modified, the information stored as the vendor, the product it is part of and the version number of the file and it contents, its original file name, and its file size.

"Genesisactor"—the key of an object that is not the direct Actor of an event but which is the ultimate parent of the event being performed. For example in the case of a software installation, this would be the key of the object that the user or system first executed and that initiated the software installation process, e.g. Setup.exe.

"Ancillary data": many events may require ancillary data, for example an event such as that used to record the creation of a registry run key. In this situation the "event" would identify the Actor object creating the registry run key, the event type itself (e.g. "regrunkey"), and the Victim or subject of the registry run key. The ancillary data in this case would define the run key entry itself; the Hive, Key name and Value.

"Event Checksums": because the event data can be quite large extending to several hundred bytes of information for a single event, its identities for the Actor and Victim and any ancillary data, the system allows for this data itself to be summarised by the Event Checksums. Two event checksums are used utilising a variety of algorithms, such as CRC and Adler. The checksums are of the core data for an event. This allows the remote computer 2 to send the checksums of the data to the central computer 3 which may already have the data relating to those checksums stored. In this case, it does not require further information from the remote computer 2. Only if the central computer 3 has never received the checksums will it request the associated data from the remote computer 2. This affords a considerable improvement in performance for both the remote and central computers 2, 3 allowing much more effective scaling.

Thus, the meta data derived from the remote computers 2 can be used at the community database 7 to define the behaviour of a process across the community. As mentioned, the data may include at least one of the elements mentioned above (file size, location, etc.) or two or three or four or five or six or all seven (or more elements not specifically mentioned here). This may be used accordingly to model, test and create new automated rules for use in the community database 7 and as rules that may be added to those held and used in the local database of the remote computers 2 to identify and determine the response of the remote computers 2 to new or unknown processes and process activity.

Moreover, it is possible to monitor a process along with any optional sub-processes as an homogenous entity and then compare the activities of the top level process throughout the community and deduce that certain, potentially malevolent practices only occur when one or more specific sub-processes are also loaded. This allows effective monitoring (without unnecessary blocking) of programs, such as Internet Explorer or other browsers, whose functionality may be easily altered by downloadable optional code that users acquire from the Internet, which is of course the principal source of malevolent code today.

The potentially high volume of active users gives a high probability of at least one of them being infected by new malware. The speed of propagation can be detected and recorded so that the propagation of malware can be detected and malware designated as bad on the basis of the speed of propagation, optionally in combination with the other factors discussed above, such as file size, location and name. The simple volume of infection can also be used as a trigger. In a further embodiment, difference of naming of an otherwise identical piece of code combined with acceleration of first attempts to execute the code within the community allows pattern matching that will show up an otherwise identically signatured piece of code as bad.

This feature allows the statement in some embodiments that "nothing will propagate in our community faster than X without being locked down", so that if any process or event propagates more quickly over a given duration, it is marked as bad. This is for reasons of safety given that if for example an object is propagating quickly enough, then it might infect computers before it can be analysed to determine whether or not it is malware.

This process can be automated by the identification of the vector of propagation in the community (i.e. the source of type of propagation), from timestamp data held in the community database and the marking of a piece of code that has these attributes as bad. By comparison, it is believed that all other anti-malware providers rely on a simplistic known bad model and therefore are reliant primarily on malware infection actually occurring on terminals and being reported.

Thus, the community database 7 can be used to make early diagnosis, or simply to take precautionary measures, and thus stop potentially fast propagating worms and other malware very, very early in their life cycle. Given that it is possible to create a worm that can infect every computer connected to the Internet within a matter of a few minutes, this feature is highly desirable.

Even faster determination may be made by combining data defining the speed of propagation of a new piece of software with metadata collected by the agent software from the remote computers 2 and fed to the community database 7. This includes monitoring processes that attempt to conceal themselves from the user by randomly changing name and/or location on the remote computers 2. It also includes a process's attempt to create an identical copy (i.e. with identical code contents) on the computer but with a different name. This is a classic attribute of a worm.

The signature of an object may comprise or be associated with a mask which can be built up with use of that object and which indicates the particular types of behaviour to be expected from the object. If an object is allowed to run on a remote computer 2, even if the initial signature search 22 indicates that the object is safe, then operation of that object may be monitored within the parameters of the mask. The mask might indicate for example, the expected behaviour of the object; any external requests or Internet connections that that object might legitimately have to make or call upon the remote computer 2 to make, including details of any ports or interfaces that might be required to be opened to allow such communication; any databases, either local or over a local area network or wide area network or Internet, that may be expected to be interrogated by that object; and so on. Thus, the mask can give an overall picture of the expected "normal" behaviour of that object.

In practice, therefore, in one embodiment the behaviour of the object is continually monitored at the remote computer(s) 2 and information relating to that object continually sent to and from the community database 7 to determine whether the object is running within its expected mask. Any behaviour that extends beyond the mask is identified and can be used to continually assess whether the object continues to be safe or not. Thus, if for example the object, on a regular basis (say monthly or yearly) opens a new port to update itself or to obtain regular data, then this information is flagged. If it is found that the object has done this on other remote computers and has had no ill effects, or this behaviour is known from other objects and known to be safe, then this behaviour might be considered as safe behaviour and the mask is then modified to allow for this. If it has been found previously that this new behaviour in fact causes unsafe or malevolent results, then the object can then be marked as unsafe even if previously it was considered safe. Similarly, if the object attempts to connect to a known unsafe website, database or to take action that is known as generally being action only taken by unsafe programs, then again the object may be considered to be unsafe.

Figure 3:
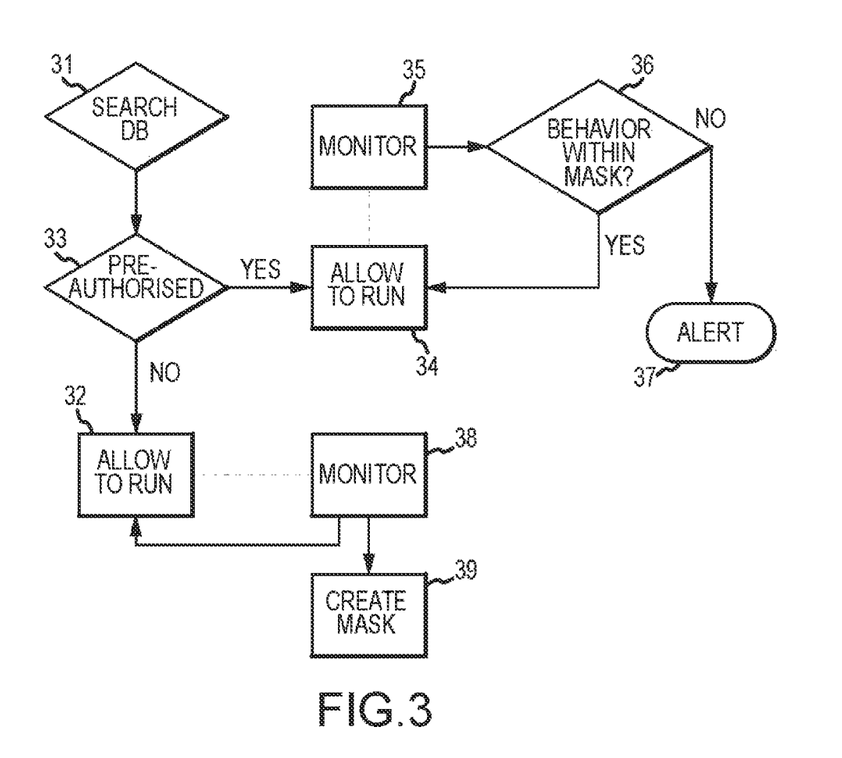
FIG. 3 is a flowchart showing schematically the operation of another example of a method according to an embodiment of the present invention; and, FIG. 4 is a flowchart showing schematically an information obtaining stage.

This is shown schematically in FIG. 3. FIG. 3 also shows the concept that any object can be pre-authorised by, for example a trusted partner, such as a major software company, a verification authority, a Government department, and so on. Pre-authorisation enables a supplier of a new object, which has not been released before, to get pre-authorisation for that object, and optionally includes the provision by that supplier of a mask detailing the expected and allowable behaviour of that object.

Referring to FIG. 3 for example, when a process is run, the local and/or community databases are searched as before at step 31. If the process is not a pre-authorised one, then the steps of FIG. 2 may be taken and the process might be allowed to run or not at step 32. If the process is pre-authorised, as determined at step 33, then it is immediately allowed to run, step 34. This may terminate the operation of the method. However, in a preferred variation, the process is then monitored whilst running, and is monitored each time it is run in the future in a monitoring state step 35 to determine whether its behaviour falls within its pre-authorised mask 36. If the behaviour falls within the pre-authorised behaviour, then the process is allowed to continue to run. If the behaviour extends beyond the allowed mask, such as by trying to instigate further processes or connections that have not been pre-authorised, then this behaviour is flagged at an alert step 37. Various actions could be taken at this stage. The process might simply not be allowed to run. Alternatively, the trusted authority that initially enabled pre-authorisation might be contacted, who may be able to confirm that this behaviour is acceptable or not. If it is acceptable, then the mask could be modified accordingly. If not acceptable, then the process might be marked as unsafe. Many other actions may be taken upon the noting of such an alert state.

If the process has been found not to be pre-authorised at step 33 but is nevertheless allowed to run, then the process is monitored at step 38 in order to generate a mask 39 representative of the normal behaviour of that process. Data representative of this mask might be sent to the community database 7 for scanning when other computers run that process. By continually monitoring a process each time it is run or during running of the process, any behaviour that differs from previous behaviour of the process can be noted and the mask can be modified, or this behaviour might be used to determine that a process that was once considered safe should now be considered to be unsafe.

Figure 4:
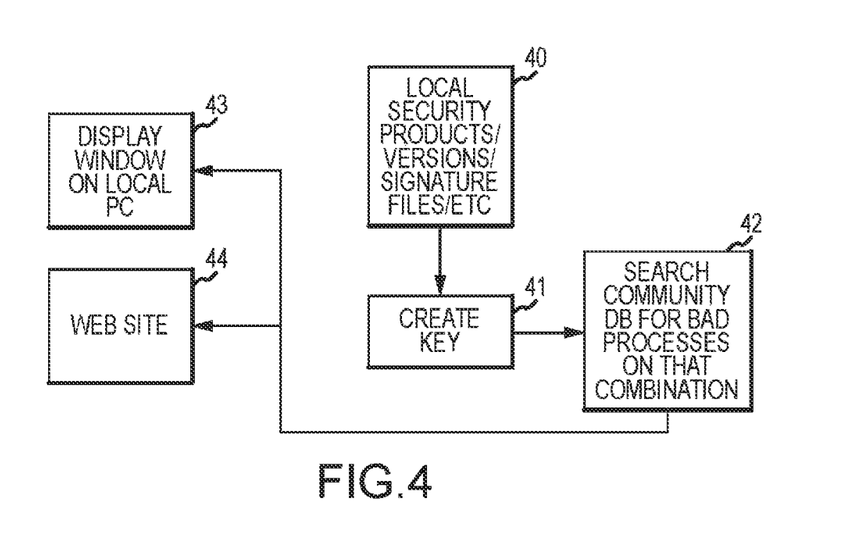

In another embodiment, a computer 2 may have agent software installed that periodically or on-demand provides information to the community database 7 that is representative of all or selected ones of the software products loaded on or available the computer 2. In particular, this may be information on one or more of: all the locally-loaded security products (such as anti-malware systems including anti-virus software, anti-spyware, anti-adware and so on), firewall products, specific settings and details of which signature files are currently loaded, version details for the operating system and other software, and also information such as which files are operating and the particular version and software settings at any time. (It will be understood from the following that auditing and testing for a match for more of these criteria increases the likelihood of computers being very similarly arranged and thus reduces the rate of false negatives and positives during the match search.)

The information relating to these software products, etc. may be provided individually to the community database. Preferably however, again for reasons of data quantity for storage and transmission, the information is provided as a signature or key representative of the information (e.g. by a hashing or compression function at the computer 2). FIG. 4 shows schematically how the details of all local security products, versions, signature files, firewall settings, etc. 40 are used to create a key 41. The key is transmitted to the community database 7. Since the community database 7 is provided with such information from many, possibly millions, of users' computers 2, it is likely to hold corresponding information for other computers 2 that have the same or a similar configuration of security products, etc. Thus, the community database 7 can be searched at step 42 for other computers 2 having the same or a similar combination of security products including the same setting, signature files loaded and so on.

The community database 7 in this embodiment is also provided by the agent software with details of processes run by every computer 2 and thus knows whether or not a process has been detected by each computer 2.

In this way, the community database 7 can be used to obtain information as to whether for example a particular, specific combination of operating system and various security products, including settings and signature files existing at a point in time, renders a particular computer 2 having those products and settings susceptible or vulnerable to any particular malware object.

In a simple example, if for example the database knows that a computer in the past has version A of anti-virus product B with downloaded signature update C, and also has a firewall D with particular settings E, and perhaps anti-spyware software F with signature updates G, but that a particular malware process P was not detected by this combination of programs at that point in time, then this information can be provided to a computer 2 that is known as having that combination of security programs/settings, and can be used to indicate that that computer 2 is vulnerable in the short term to attack by that particular malware process. This information can be presented to the user either by displaying a window 43 on the screen display of the computer 2 or by directing the user to a particular website which explains the position in more detail. The user might be informed for example that their particular combination of security products, etc., exposes their computer to a risk of being infected by the Sobig virus as that virus is not detectable by their computer. The user might be offered specific advice (e.g. to update a particular anti-virus program with a particular signature file) or software to download and install to remove the risk.

Thus, the community database 7, when provided with information relating to all the security products, etc. on a particular computer at a particular time, is searched for events for processes marked as "bad" that occurred on computers with that particular mix of security products and that were not locally detected. This information can then be fed back to the user of the particular computer, for example directly or by directing the user to a website. This information can be provided virtually in real-time, allowing a new user or a user of a new computer to be able to increase the computer's effective security very quickly.

The preferred method also tracks which objects are related to each other and uses the concept of ancestry to enable objects to be marked as malware. For example, any particular process may spawn child processes which are therefore related. The key relating to the first object may be inspected to identify a component that uniquely identifies the first object and that is inherited or otherwise present in the key of a descendant or other related object of the first object. This component is referred to herein as a "gene". This general technique may be used in a number of ways:

a) A known and trusted parent process is afforded the ability to create child processes which may be automatically marked as safe to run on the local computer. It is also possible that this "inherited" property may be passed down to grand children processes and so on. This safe status is passed to the parent's child processes and possibly, through them, further child processes (referred to here as "issue"), such signatures for the issue can all automatically be recorded in the local database as good. This allows the issue processes to be quickly marked as good, even if a connection to the community database 7 is not available.

b) By monitoring activity of the parent process, if it is later found that the parent process is malware, then all of the issue processes can all automatically be recorded in the local database as bad.

C) Similarly, by monitoring activity of the issue processes, if it is later found that one of the issue processes is malware, then one or more of the parent process and all of the other issue processes (i.e. all of the related processes in this context) can all automatically be recorded in the local database as bad.

d) Parental creation of a signature for a child or children including the ability for these to be automatically marked as either good or bad depending on the parent's behaviour and determination. Note that in some embodiments the product can "watch" or monitor the birth of a child process and automatically create the signature upon arrival. This provides the ability to monitor the creation of a bad program by another bad program. It is possible therefore to monitor the ancestry of a program so if for example the grandfather creates a program (the father) and this in turn creates a bad program (the son), it is possible automatically to determine the father as a bad program.

e) A feature may be included that allows for automatic forfeiture of a child's inherited ability to trigger the automatic creation of signatures on any further births because the child, as parent, has already produced bad offspring. Preferably, a rule is that if a file has one bad offspring then the inherited ability can be automatically removed.

f) An ability to watch clones or identical twins of objects (e.g. the same process running on other systems in the community) to compare the pattern of their issue and to make decisions as to whether or not to treat any particular process as malware.

One or more of these features a) to f) can be used to provide a solution to the problem of producing a security product that can be used effectively without 100% reliance on being permanently connected to the Internet, which is often impractical. Examples of this are Windows Update and other processes used more and more by vendors who wish to be able to roll out product updates automatically across the worldwide web.

Possible benefits of these types of features above conventional software are as follows. Antivirus software tends to have a cache of known bad signatures. The problem is keeping this up to date. Take the simple example of someone buying a new computer. The computer comes with an antivirus product preloaded with a signature cache. Between the time when the PC was built, shipped to the store and bought by the user several days or weeks will have passed. The user starts the PC and is exposed to any new virus or malware which was created after the PC was built. Full protection requires the user to connect to the internet and download updates. This cannot be guaranteed to occur ahead of other activities by the user on the internet (almost physically impossible to guarantee). With a local cache of known good processes, as in the embodiments of the present invention, it is possible to ship the computer/terminal preloaded with a pre-generated cache of signatures for all of the good (clean) software preloaded by the computer manufacturer. In this case the user can connect to the internet knowing that any new or updated programs will be immediately detected and verified. Also any auto-updating software can function forcing signatures to be automatically built for its children and more remote off-spring (i.e. grandchildren, great-grandchildren, etc).

Reference is now made to "Defeating Polymorphism: Beyond Emulation" by Adrian Stepan of Microsoft Corporation published in "Virus Bulletin Conference, October 2005" and also to U.S. 60/789,156 filed on 5 Apr. 2006, the entire content of which are hereby incorporated by reference. In that paper and patent application, there are disclosed methods of decrypting files to allow the files to be analysed to determine whether or not the file actually is malware. In U.S. 60/789,156 in particular, there is disclosed a method of unpacking/decrypting an executable computer file using a host computer, the method comprising: partitioning the executable computer file into plural basic blocks of code; translating at least some of the basic blocks of code into translated basic blocks of code that can be executed by the host computer; linking at least some of the translated basic blocks of code in memory of the host computer; and, executing at least some of the translated basic blocks of code on the host computer so as to enable the executable computer file to be unpacked or decrypted, whereupon the unpacked or decrypted executable computer file can be analyzed to determine whether the executable computer file is or should be classed as malware. There is also disclosed in U.S. 60/789,156 a method of unpacking/decrypting an executable computer file, the method comprising: partitioning the executable computer file into plural basic blocks of code; creating at least a read page of cache memory for at least some of the basic blocks, the read page of cache memory storing a read cached real address corresponding to a read cached virtual memory address for the respective basic block, and creating at least a write page of cache memory for at least some of the basic blocks, the write page of cache memory storing a write cached real address corresponding to a write cached virtual memory address for the respective basic block; and, emulating the executable file by executing at least some of the basic blocks of code so as to enable the executable computer file to be unpacked or decrypted, whereupon the unpacked or decrypted executable computer file can be analyzed to determine whether the executable computer file is or should be classed as malware; wherein during the execution of a basic block, at least one of the read page and the write page of cache memory is checked for a cached real address corresponding to the virtual address that is being accessed for said basic block.

The techniques disclosed in these documents can be used in the present context when it is desired to analyse a file in detail. More generally however, the techniques disclosed in these papers, and particularly the enhanced techniques disclosed in U.S. 60/789,156, can be used to provide information about the activity of a file when it is run on a computer because the techniques disclosed in these papers emulate the running of the file and therefore allow the file's activity to be interpreted.

A further situation arises when users wish to install software while offline. In a preferred embodiment, when a user attempts to install new software while offline, agent software running on the user's computer 2 prompts the user for authorisation to allow the installation process to proceed such that the execution of the installation can itself be "authorised" by the user. This authorisation by the user is treated as a "Genesis" event and will be so termed hereinafter. However there are some processes commonly used in installation of software that communicate with other existing programs on the installation machine, e.g. Microsoft's MSIEXEC.

The Genesis approach involves a process that generates signatures as a result of the user's authorisation on the user's computer 2. Those signatures are stored in the local database on the user's computer 2. In one embodiment, those locally stored signatures are referred to as necessary by the agent software during the installation process so that the installation can proceed. Alternatively, the security checks made by the agent software can be switched off during the installation process. The switching off may only be for a limited duration, such as a few minutes which should be sufficient to allow most software to be installed, the off time optionally being user-configurable.

In any event, once the installation has been completed and the user's computer 2 connected to the community database 7, the agent software on the user's computer 2 can upload the signatures relating to the installation from the user's local database to the community database 7. With corresponding data from other users' computers 2, the community database 7 can then be used to make a rapid determination that the installation of this particular software is benign.

As a variant to this embodiment, when a user's computer 2 is at some point in time on-line, the agent software on the user's computer 2 may download signatures of a so-called "trusted installer" or "licensed installer". This allows the operation of a method such that a "licensed installer" and any child processes of the licensed installer are permitted to execute while a Genesis event is "current", e.g. within a period of minutes after an authorisation from the user. Preferably signatures of licensed installers are always downloaded, as and when added to the community database 7, to a remote computer 2 while online.

There may be further refinements to this method, such as to prevent licensed installers executing if a media change has occurred during the currency of a Genesis event. However, any unknown processes, which may be malware, may still be detected and blocked. Having a small number of licensed installers facilitates download, as minimal data is required, especially compared to downloading virus signature files. As another example, super-trusted installers, such as for example "Windows Update", may be employed whereby all new processes created by the super-trusted installer are marked immediately as safe.

In the case of an installation occurring when the remote computer 2 is connected to the community database 7, another option is that if the software that is about to be installed is not known to the community database 7, then the system will block the installation or alert the user. For example, a message may be displayed at the user's computer 2 to the effect that "You are about to install some software. This software is not known to [the community]. Are you sure you wish to proceed?".

Embodiments of the present invention have been described with particular reference to the examples illustrated. However, it will be appreciated that variations and modifications may be made to the examples described within the scope of the present invention.

The invention claimed is:

1. A method of classifying a computer object as malware, the method comprising:
   at a base computer, receiving data about a computer object from a first remote computer on which the computer object or similar computer objects are stored, wherein said data includes information about events initiated or involving the computer object when the computer object is created, configured or runs on the first remote computer, said information including at least an identity of an object initiating the event, the event type, and an identity of an object or other entity on which the event is being performed;
   at the base computer, receiving data about the computer object from a second remote computer on which the computer object or similar computer objects are stored, wherein said data includes information about events initiated or involving the computer object when the computer object is created, configured, or runs on the second remote computer, said information including at least an identity of an object initiating the event, the event type, and an identity of an object or other entity on which the event is being performed;
   storing, at the base computer, said data received from the first and second remote computers;
   correlating, by the base computer, at least a portion of the data about the computer object received from the first remote computer to at least a portion of the data about the computer object received from the second remote computer;
   comparing, by the base computer, the correlated data about the computer object received from the first and second remote computers to other objects or entities to identify relationships between the correlated data and the other objects or entities; and
   classifying, by the base computer, the computer object as malware on the basis of said comparison.

2. A method according to claim 1, wherein the relationship is between objects related directly, or between objects related via other objects.

3. A method according to claim 1, wherein where an object and other objects are found to have a relationship, monitoring those related objects as a homogenous entity and identifying a common object of the homogenous entity as a malware object.

4. A method according to claim 1, comprising deducing an object to be malware based on the behaviour of a related object.

5. A method according to claim 1, wherein if at least one other object to which said computer object is related is classed as malware, then classifying said computer object as malware.

6. A method according to claim 1, wherein said other objects include the object or similar objects stored on at least one of the first and second remote computers.

7. A method according to claim 1, wherein said other objects include other objects that are parent objects or child objects or otherwise process-related objects to said computer object.

8. A method according to claim 1, wherein the data about the computer object that is sent from the respective remote computer to the base computer and that is used in the comparison includes one or more of:
　executable instructions contained within or constituted by the computer object;
　the size of the computer object;
　the current name of the computer object;
　the physical and folder location of the computer object on disk;
　the original name of the computer object;
　the creation and modification dates of the computer object;
　vendor, product and version and any other information stored within the computer object; and
　the computer object header or header held by the respective remote computer.

9. A method according to claim 1, wherein the data is sent in the form of a key that is obtained by a hashing process carried out in respect of the objects on the respective remote computer.

10. A method according to claim 9, wherein the key has at least one component that represents executable instructions contained within or constituted by the computer object.

11. A method according to claim 9, wherein the key has at least one component that represents data about said computer object.

12. A method according to claim 11, wherein said data about said computer object includes at least one of:
　the current name of the computer object;
　the physical and folder location of the computer object on disk;
　the original name of the computer object;
　the creation and modification dates of the computer object;
　vendor, product and version and any other information stored within the computer object;
　the computer object header or header held by the respective remote computer; and,
　events initiated by or involving the computer object when the computer object is created, configured or runs on the respective remote computers.

13. A method according to claim 9, wherein the key has at least one component that represents the physical size of the computer object.

14. A method according to claim 1, comprising initially classifying a computer object as not malware, generating a mask for said computer object that defines acceptable behaviour for the computer object, monitoring an operation of the computer object on at least one of the first and second remote computers and reclassifying the computer object as malware if the actual monitored behaviour extends beyond that permitted by the mask.

15. An apparatus for classifying a computer object as malware, the apparatus comprising:
　a base computer constructed and arranged to receive data about a computer object from a first remote computer on which the computer object or similar computer objects are stored, wherein said data includes information about events initiated or involving the computer object when the computer object is created, configured, or runs on the first remote computer, said information including at least an identity of an object initiating the event, the event type, and an identity of an object or other entity on which the event is being performed;
　the base computer being constructed and arranged to receive data about the computer object from a second remote computer on which the computer object or similar computer objects re stored, wherein said data includes information about events initiated or involving the computer object when the computer object is created, configured, or runs on the second remote computer, said information including at least an identity of an object initiating the event, the event type, and an identity of an object or other entity on which the event is being performed;
　the base computer being constructed and arranged to correlate at least a portion of the data about the computer object received from the first remote computer to at least a portion of the data about the computer object received from the second remote computer;
　the base computer being constructed and arranged to compare the data about the computer object received from the first and second remote computers to other objects or entities to identify relationships between the correlated data and the other objects or entities; and
　the base computer being constructed and arranged to classify the computer object as malware on the basis of said comparison.

16. Tha apparatus according to claim 15, wherein the base computer is constructed and arranged so as to identify the relationship between objects related directly, or between objects related via other objects.

17. The apparatus according to claim 15, wherein the base computer is constructed and arranged so as, where an object and other objects are found to have a relationship, to monitor those related objects as a homogenous entity and identify a common object of the homogenous entity as a malware object.

18. The apparatus according to claim 15, wherein the base computer is constructed and arranged so as to deduce an object to be malware based on the behaviour of a related object.

19. The apparatus according to claim 15, wherein the base computer is constructed and arranged so that if at least one other object to which said object is related is classed as malware, then said object is classified as malware.

20. The apparatus according to claim 15, wherein the base computer is constructed and arranged so that said other objects include the object or similar objects stored on at least one of the first and second remote computers.

21. The apparatus according to claim 15, wherein the base computer is constructed and arranged so that said other objects include other objects that are parent objects or child objects or otherwise process-related objects to said object.

22. The apparatus according to claim 15, wherein the base computer is constructed and arranged so as to compare the data where the data includes one or more of:
- executable instructions contained within or constituted by the computer object;
- the size of the computer object;
- the current name of the computer object;
- the physical and folder location of the computer object on disk;
- the original name of the computer object;
- the creation and modification dates of the computer object;
- vendor, product, and version and any other information stored within the computer object; and
- the computer object header or header held by the respective remote computer.

23. The apparatus according to claim 15, wherein the base computer is constructed and arranged so as to be able to process data that is sent in the form of a key that is obtained by a hashing process carried out in respect of the objects on said respective remote computer.

24. The apparatus according to claim 23, wherein the key has at least one component that represents executable instructions contained within or constituted by the computer object.

25. The apparatus according to claim 23, wherein the key has at least one component that represents data about said computer object.

26. Apparatus according to claim 25, wherein said data about said object includes at least one of:
- the current name of the computer object;
- the physical and folder location of the computer object on disk;
- the original name of the comptuer object;
- the creation and modification dates of the computer object;
- vendor, product, and version and any other information stored within the computer object;
- the computer object header or header held by the respective remote computer; and
- events initiated by or involving the computer object when the computer object is created, configured, or runs on the respective remote computers.

27. The apparatus according to claim 23, wherein the key has at least one component that represents the physical size of the computer object.

28. The apparatus according to claim 15, wherein the base computer is constructed and arranged to generate a mask for a computer object that is initially classed not as malware, said mask defining acceptable behaviour for the computer object, and the base computer is constructed and arranged to monitor an operation of the computer object on at least one of the first and second remote computers and to reclassify the computer object as malware if the actual monitored behaviour extends beyond that permitted by the mask.

29. A computer program recorded on non-transitory computer readable medium comprising program instructions for causing a computer to perform the method of claim 1.

30. A method according to claim 1, wherein the data received about the computer object from the first remote computer is different than the data received about the computer object from the second remote computer.

* * * * *